United States Patent [19]
Campbell

[11] 3,780,895
[45] Dec. 25, 1973

[54] LOAD HANDLING VEHICLE

[75] Inventor: Matthew Teasdale Campbell, Newcastle upon Tyne, England

[73] Assignee: Fork Lift Truck Patentees Establishment, Lemington, New Castle upon Tyne, England

[22] Filed: May 14, 1971

[21] Appl. No.: 143,339

[52] U.S. Cl. .............................. 214/770
[51] Int. Cl. .............................. E02f 3/00
[58] Field of Search .................. 214/140, 770, 672

[56] References Cited
UNITED STATES PATENTS
3,543,957  12/1970  Russell .............................. 214/770
2,980,271  4/1961  Ulinski .............................. 214/770
2,258,918  10/1941  Wagner .............................. 214/672
2,849,132  8/1958  Clarke .............................. 214/770

Primary Examiner—Gerald M. Forlenza
Assistant Examiner—John Mannix
Attorney—Sughrue, Rothwell, Mion, Zinn & Macpeak

[57] ABSTRACT

A load handling vehicle has load raising means comprising a box-section mast pivotally mounted on the vehicle chassis between its front and rear wheel units for displacement between a rearwardly extending generally horizontal position and a generally erect position, a cranked boom having one end pivotally connected to the free end of said mast and its other end adapted to receive a load carrying member such as a fork lift mast, a first operating means for effecting displacement of said mast and a second operating means for effecting angular displacement of the boom relative to said mast.

7 Claims, 4 Drawing Figures

INVENTOR
MATTHEW TEASDALE CAMPBELL
BY Sughrue, Rothwell, Mion,
Zinn & Macpeak
ATTORNEYS

LOAD HANDLING VEHICLE

This invention concerns improvements in or relating to load handling vehicles having load raising means. Such vehicles are usually called "fork lift trucks" irrespective of whether the load-carrying member is in the form of a fork or another form of platform.

Known vehicles of this type are provided with a substantially vertical "fork lift" mast mounted directly on the vehicles chassis, and along which the load-carrying member is displaceable. In such an arrangement the range of movement of the load-carrying member is limited by the height of the mast, and this height cannot be too great without making the truck excessively unweildy and increasing to an unwarranted extent the headroom required for movement of the truck.

Various attempts have been made to increase the range of movement of the load-carrying member, including mounting the vertical mast on the end of a gib which is itself pivotally mounted on the chassis of the vehicle.

In another arrangement the load-carrying member is displaceably mounted on a telescopically extensible mast.

It has also been proposed to mount the load carrying member on the end of a gib pivoted to linkages or struts mounted at the front end of the vehicle, the gib and linkages being raised by hydraulic rams.

Such arrangements have numerous disadvantages, the most common being the operator's restricted visibility of the load-carrying member, particularly when in its low or retracted position. A further disadvantage of at least some of the above arrangements is the torsional instability of the load raising means when under loading conditions.

The object of the present invention is to provide a load handling vehicle of the fork lift type in which the load-carrying member is safely displaceable through a large range of movement relative to the overall length and height of the vehicle in its lowered or retracted condition.

According to the present invention such a load handling vehicle includes a load raising means comprising a box-section mast pivotally mounted on the vehicle chassis at a point between its front and rear wheel units for displacement between a rearwardly extending generally horizontal position and a generally erect position, a cranked boom having one end pivotally connected to the free end of the mast and its other end adapted to receive a load-carrying member, a first operating means for effecting displacement of the mast, and a second operating means for effecting angular displacement of the boom relative to the mast.

Preferably the first and second operating means are hydraulic or pneumatic rams extending respectively between the free end of a cranked member rigidly depending from the base of the mast and a convenient anchorage point on the vehicle chassis, and between the apex region of the cranked boom and the central region of the mast. Fixed seating surfaces may be provided on the vehicle chassis for engagement by the base of the mast so as to define its generally horizontal and generally erect positions. A similar seating surface may be provided on the vehicle chassis for engagement by the boom when in its lowered position. The cranked boom is preferably so designed that its free end is at or near the ground when in its lowered position.

Alternatively or additionally the generally erect position of the mast may be defined by a hinged tie-bar at the rear of the mast, the tie-bar being pivotally connected to the upper end of the mast and to the vehicle chassis and being hinged to break downwardly when the mast is lowered.

In a preferred embodiment of the invention a system of pivotally connected arms extend parallel or substantially parallel with the mast and with the boom and remain parallel or substantially parallel therewith as the boom is moved relative to the mast, the arrangement being such that a load-carrying member such as a forklift mast attached to the free ends of the boom and the adjacent parallel arm is maintained in a vertical or substantially vertical disposition irrespective of the relative positions of the main mast and boom.

In order to provide the load raising means with a slewing action, the mast and its seating surfaces, the first operative means and a suitable counterweight may all be mounted on a sub-frame rotatably mounted on the vehicle chassis.

The invention will now be described further, by way of example, with reference to the accompanying drawings, in which.

Figure 1:
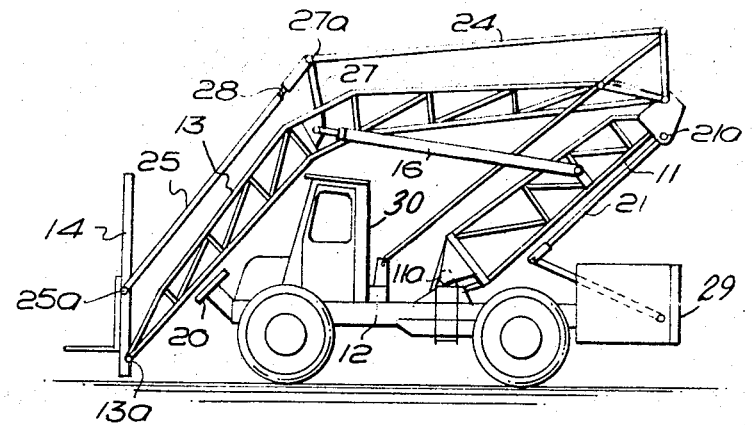
FIG. 1 is a side elevation of a load carrying vehicle according to a preferred embodiment of the invention, showing the mast, partly raised.
Figure 2:
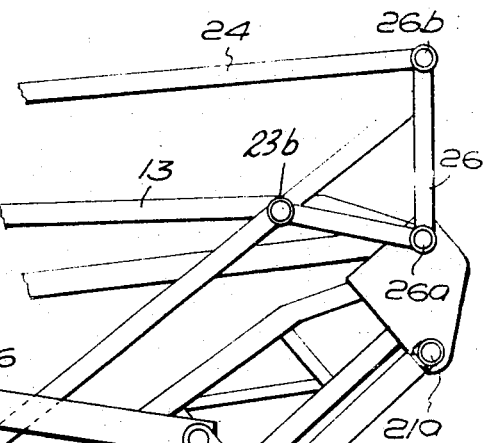
FIG. 2 is an enlarged detail of FIG. 1.
Figure 2:
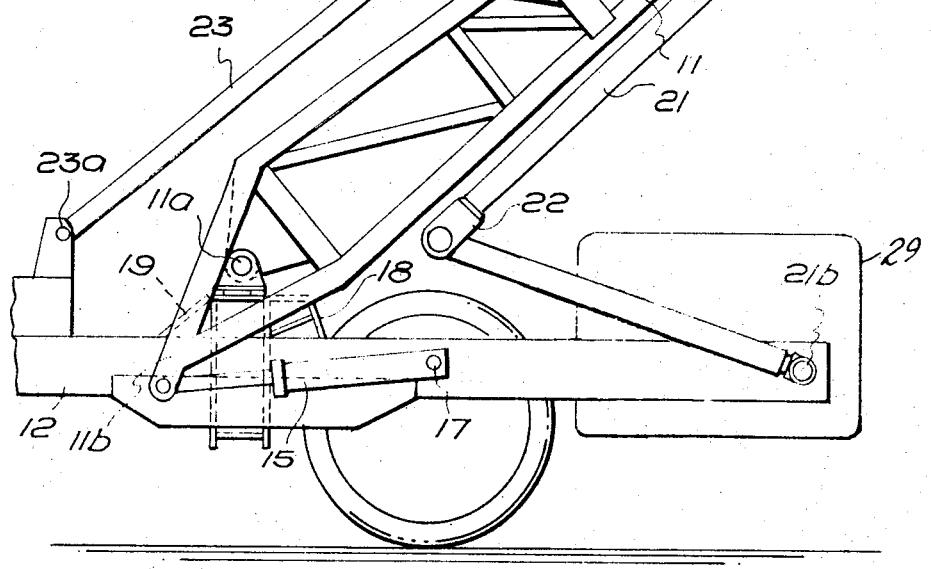
Figure 3:
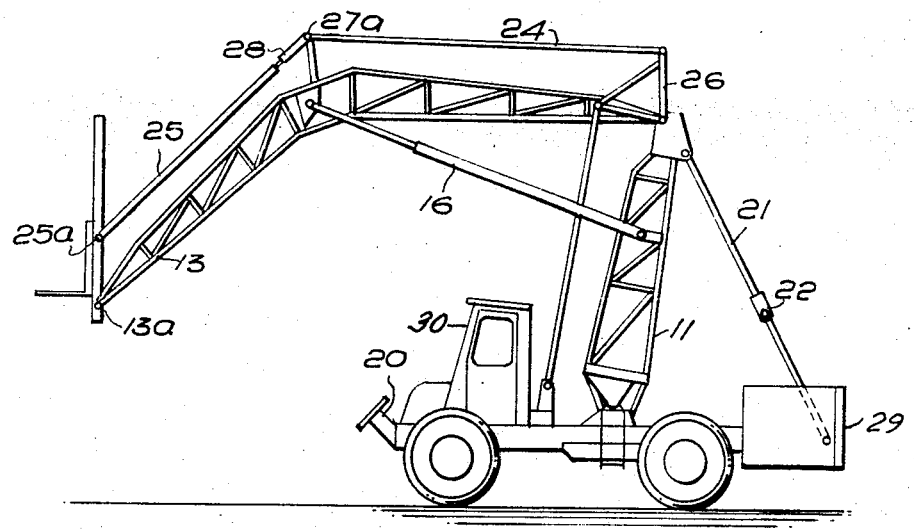
FIG. 3 is a view similar to FIG. 1 showing the mast fully raised and the boom partly raised.
Figure 4:
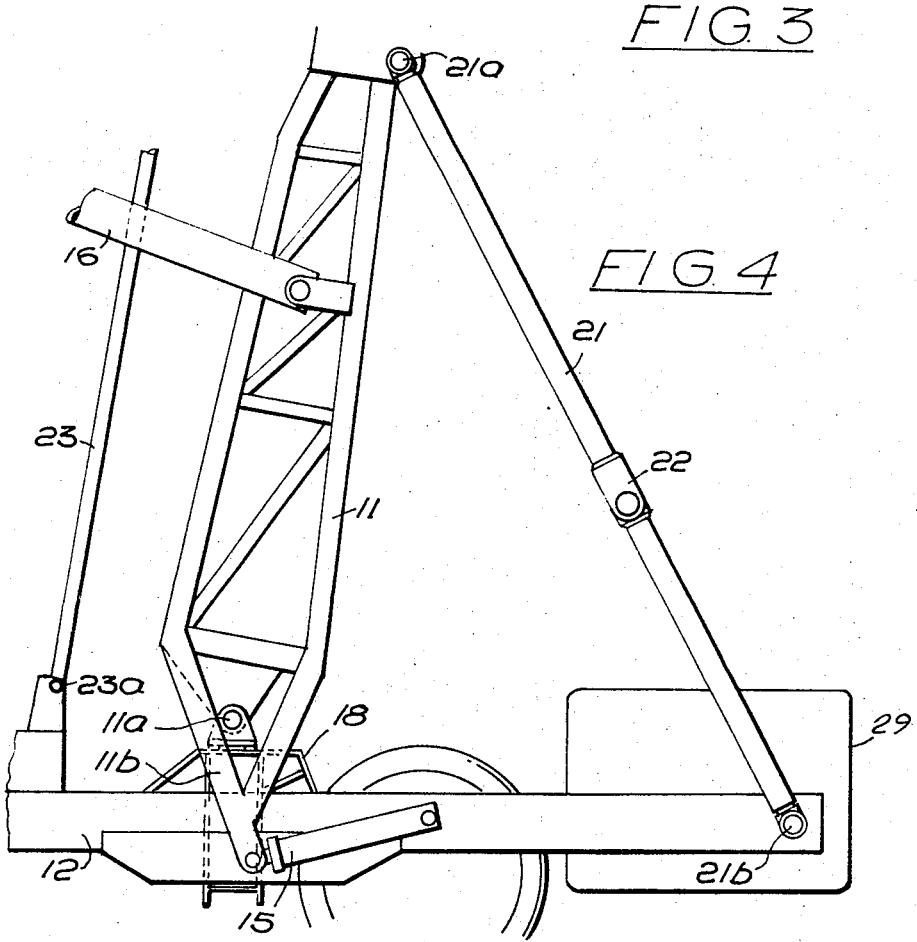
FIG. 4 is an enlarged detail of FIG. 3.

The drawings show a load handling vehicle having a load raising means comprising a box-section mast 11 pivotally mounted on the vehicle chassis 12 at a point 11a between its front and rear wheel units for displacement between a rearwardly extending, lowered position and a generally erect position as shown in FIG. 3. The free end of mast 11 has one end of a cranked boom 13 pivotally connected thereto, the other end of the boom 13 being adapted to receive a load-carrying member such as a fork-lift mast 14.

First and second operating means 15 and 16 in the form of hydraulic or pneumatic rams extend respectively between the free end of a leverage member 11b rigidly depending from the base of mast 11 and a convenient anchorage point 17 on the chassis 12, and between the apex region of the cranked boom 13 and the central portion of the mast 11.

Fixed seating surfaces 18 and 19 are provided on the vehicle chassis 12 for engagement by the base of mast 11 so as to respectively define its lowered and generally erect positions. A seating surface 20 is also provided on the chassis for engagement by the boom 13 when in its lowered position. Boom 13 is so designed that its free end 13a is at or near the ground when in its lowered position.

The geometry of the mast/boom arrangement is such that a load on the boom 13 acts about the pivot 11a between the mast and the vehicle chassis 12 in such a manner as to bias the mast 11 towards its generally erect attitude, thereby improving the operational safety of the vehicle and reducing the effort required of the first operating means 15 during a lifting operation. This feature enables smaller rams to be used than would otherwise be required. Counterweight 29 is mounted at the rear of the vehicle in the conventional manner. However, the fact that the mast is mounted behind the driver's cab 30 and engine (not shown) permits lighter counterweights to be used than were used with prior-art vehicles in which the mast was mounted in front of the driver's cab.

Mast 11 is given additional support when in its generally erect position by a hinged tie-bar 21 having one end pivotally connected to the upper end of the mast 11 at a point 21a and its other end pivotally connected to the vehicle chassis at a point 21b. The tie-bar 21 is provided with a hinge 22 at its mid region so as to break downwardly when the mast 11 is lowered.

An arrangement of pivotally connected arms 23, 24 and 25 extend parallel or substantially parallel with the mast 11 and with the boom 13. Arm 23 has one end pivotally connected to the vehicle chassis at point 23a and its other end connected at 23b to a triangular member 26 which is itself pivotally mounted to the top end of the mast 11 at a point 26a. Arm 24 has its rear end pivotally connected to the apex region of the triangular member at 26b, while its front end is pivotally connected at 27a to a linkage 27 whose other end is pivotally connected to the apex region of boom 13. Also pivotally connected at 27a is one end of arm 25, its free end 25a being adapted to be connected to a load carrying member such as a fork-lift mast 14. In this arrangement, arm 23 will remain parallel or substantially parallel with mast 11 during raising and lowering of the mast, while arms 24 and 25 will remain parallel or substantially parallel with the respective adjacent limbs of cranked boom 13 during movement of boom 13 relative to mast 11. The load-carrying member such as fork-lift mast 14 attached to the free ends 13a and 25a of boom 13 and arm 25 respectively is thus maintained in a vertical or substantially vertical disposition irrespective of the relative positions of the mast 11 and boom 13. Arm 25 is adjustable in length by means of a threaded connection 28 between two portions of its length, thereby permitting angular adjustment of the load carrying member to achieve its desired vertical or substantially vertical disposition.

I claim:

1. A load handling vehicle having a driver's cab, a chassis with front and rear road wheel units, and load raising means, said load handling vehicle comprising:
    a box section mast a first end of which is pivotally mounted on the chassis at a point behind the driver's cab and between the front and rear road wheel units for displacement between a rearwardly extending lowered position and a generally erect position;
    a cranked boom having one end pivotally connected to the second end of said box section mast and its other end adapted to receive a load carrying member;
    a hinged tie-bar having one end pivotally connected to the second end of said box section mast and the other end pivotally connected to the chassis at a point rearward of the point at which said mast is pivotally mounted on the chassis, said tie-bar being hinged at its mid region so as to break downwardly when said mast is lowered;
    a cranked member depending rigidly from the first end of said box section mast;
    a first fluid-operated ram extending between the end of said cranked member remote from said box section mast and a convenient anchorage point on the chassis; and
    a second fluid-operated ram extending between the apex region of said cranked boom and the central region of said box section mast.

2. A load handling vehicle as claimed in claim 1 in which said box section mast, said first fluid-operated ram, and a counterweight are all mounted on a sub-frame which is rotatably mounted on the chassis.

3. A load handling vehicle as claimed in claim 1 and further comprising:
    a fixed seating surface mounted on the chassis for engagement by said cranked boom when said box section mast and said boom are in their lowered position.

4. A load handling vehicle as claimed in claim 1 in which an arrangement of pivotally connected arms extend parallel or substantially parallel with the mast and with the boom and remain parallel or substantially parallel therewith as the boom is moved relative to the mast, the arrangement being such as to maintain a load-carrying member attached to the free ends of the boom and the adjacent parallel arm in a vertical or substantially vertical disposition irrespective of the relative positions of the mast and boom.

5. A load handling vehicle as claimed in claim 4 in which the arrangement of pivotally connecting arms comprises a first arm extending parallel or substantially parallel to the mast and having one end pivotally connected to the vehicle chassis and its other end pivotally connected to a triangular member itself pivotally connected to the upper end of the mast, a second arm having one end pivotally connected to the apex region of the triangular member and its other end pivotally connected to one end of a linkage whose other end is pivotally connected to the apex region of the cranked boom, and a third arm having one end pivotally connected to the said one end of the linkage and its free end adapted to be connected to a load carrying member.

6. A load handling vehicle as claimed in claim 5 in which
    said box section mast, said first fluid-operated ram, and a counterweight are all mounted on a sub-frame which is rotatably mounted on the chassis and
    said other end of said hinged tie-bar and said one end of said first arm are pivotally connected to said sub-frame.

7. A load handling vehicle as claimed in claim 5 in which said third arm is adjustable in length by means of a threaded connection between two portions of its length.

* * * * *